No. 796,681. PATENTED AUG. 8, 1905.
E. C. STEEN.
HEATING DEVICE.
APPLICATION FILED NOV. 29, 1904.

WITNESSES:
Chas. K. Davis.
M. E. Moore

INVENTOR
Emma C. Steen,
BY Wm. N. Moore

Attorney

UNITED STATES PATENT OFFICE.

EMMA C. STEEN, OF WAHOO, NEBRASKA.

HEATING DEVICE.

No. 796,681.  Specification of Letters Patent.  Patented Aug. 8, 1905.

Application filed November 29, 1904. Serial No. 234,770.

*To all whom it may concern:*

Be it known that I, EMMA C. STEEN, a citizen of the United States, residing at Wahoo, in the county of Saunders and State of Nebraska, have invented certain new and useful Improvements in Heating Devices, of which the following is a specification.

My invention relates to improvements in heating devices; and the object of my invention is the provision of a device of the simplest and cheapest possible construction, adapted to be placed upon a stove for heating irons or for other purposes where a heat-retaining device could be used.

With this object in view my invention consists of a heating device embodying novel features of construction and combination of parts substantially as disclosed herein.

Figure 1:
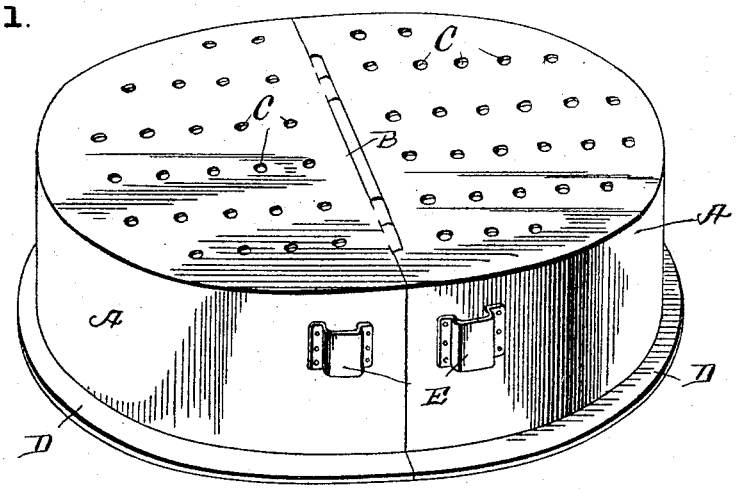
Figure 3:
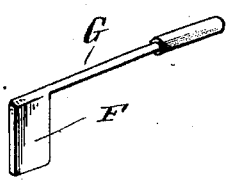
Figure 2:
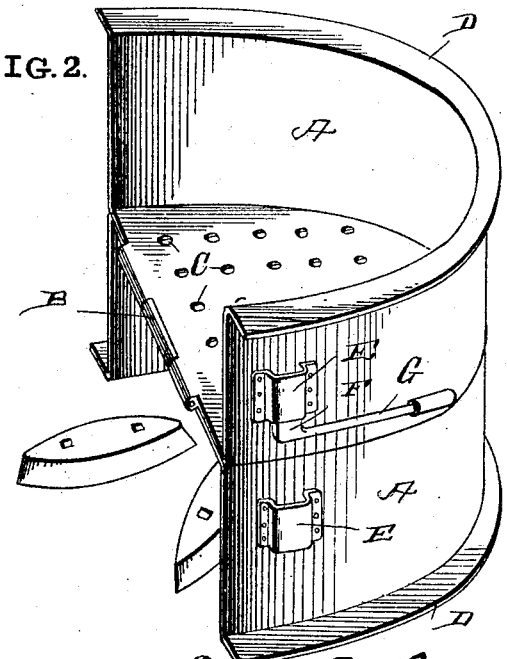
Figure 4:
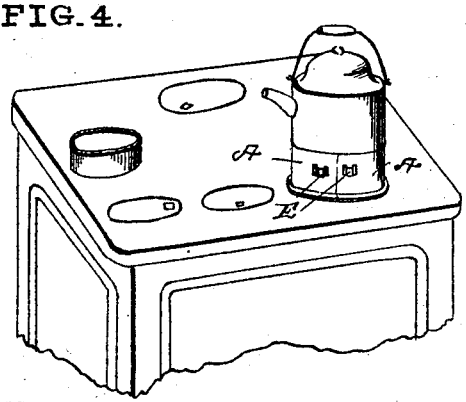

Figure 1 represents a perspective view of the complete device in position for use. Fig. 2 represents a similar view with one of the sections open or thrown back. Fig. 3 represents a detail view of the tool or implement for opening the section of my device, and Fig. 4 represents a view of my device upon a stove and used for heating a kettle or pot.

My device is of extremely simple construction and consists of the two similar semicylindrical sections A, hinged at B along their central lines, the top being provided with openings or perforations C and the lower edge being formed with a supporting rim or flange D. From this construction it will be observed that the device when closed and placed upon the stove forms a heat-retaining means particularly useful in heating irons and that upon the top may be placed a kettle or cooking utensil and that both functions will be performed in a perfect manner.

To permit the ready opening and closing of either of the sections, I provide the cleats E, one on each section, which are adapted to receive the blade F on the handle implement G, as clearly shown in Fig. 2, which permits the ready opening and closing of the sections without danger of burning the hands of the user.

It is evident that I provide a device which will retain a vast amount of heat and perform its functions in a thoroughly efficient manner, which can be manufactured at a very low price, and will prove both practical and desirable.

I claim—

The heat-retaining device herein shown and described, consisting of the twin sections or members of semicylindrical shape, the hinge connecting said sections at the top along their meeting edge, said sections when closed forming a circular heat-retaining chamber and the top serving to receive a cooking utensil, said top being provided with perforations to permit the escape of heat, and the cleat on one side of each section to receive an implement for opening and closing said sections.

In testimony whereof I affix my signature in presence of two witnesses.

EMMA C. STEEN.

Witnesses:
 ERNEST HANSON,
 L. J. KUDRNA.